United States Patent [19]

Tanabe et al.

[11] Patent Number: 4,794,626
[45] Date of Patent: Dec. 27, 1988

[54] APPARATUS FOR RELIABLY FETCHING DATA, ON THE BASIS OF FRAMING CODE DETECTION PROCESS, AND METHOD THEREFOR

[75] Inventors: Toshiyuki Tanabe, Ageo; Morio Ando, Gyoda, both of Japan

[73] Assignee: Kabushiki Kaisha Toshiba, Kawasaki, Japan

[21] Appl. No.: 30,689

[22] Filed: Mar. 26, 1987

[30] Foreign Application Priority Data

Mar. 31, 1986 [JP] Japan .................................. 61-70817

[51] Int. Cl.$^4$ ............................................. H04L 7/02
[52] U.S. Cl. .................................... 375/110; 375/116; 371/47; 370/100; 358/148
[58] Field of Search ............... 375/106, 116, 111, 113, 375/114, 116, 119; 370/100; 371/47; 358/148, 264

[56] References Cited

U.S. PATENT DOCUMENTS

| | | | |
|---|---|---|---|
| 3,978,285 | 8/1976 | Tan et al. | 375/119 |
| 4,002,845 | 1/1977 | Kaul et al. | 375/106 X |
| 4,316,285 | 2/1982 | Bosilin et al. | 371/47 X |
| 4,602,367 | 7/1986 | McDermott, III | 375/114 X |
| 4,638,497 | 1/1987 | Koratsu et al. | 376/116 |
| 4,641,327 | 2/1987 | Wei | 375/114 |
| 4,712,131 | 12/1987 | Tanase | 375/110 X |

Primary Examiner—A. D. Pellinen
Assistant Examiner—Derek S. Jennings
Attorney, Agent, or Firm—Cushman, Darby & Cushman

[57] ABSTRACT

A transmission signal includes a framing code and a data signal following the framing code. The framing code has a predetermined pattern which can be identified even if a bit error occurs therein. A signal fetcher fetches the transmission signal upon detecting the framing code which is included therein, on the basis of a reference signal. A framing code detector compares an output from the fetcher with pattern data corresponding to a predetermined pattern of the framing code. If the output has a bit error with respect to the pattern data, the detector generates a first framing code-detection output, for supply to the fetcher, as a signal for providing the timing. However, if the output coincides with the pattern data, the detector generates a second framing code-detection output. A reference signal generator generates the reference signal for the fetcher, in correspondence with the second framing code-detection output.

10 Claims, 14 Drawing Sheets (FRAMING CODE)

(SLICE DATA)

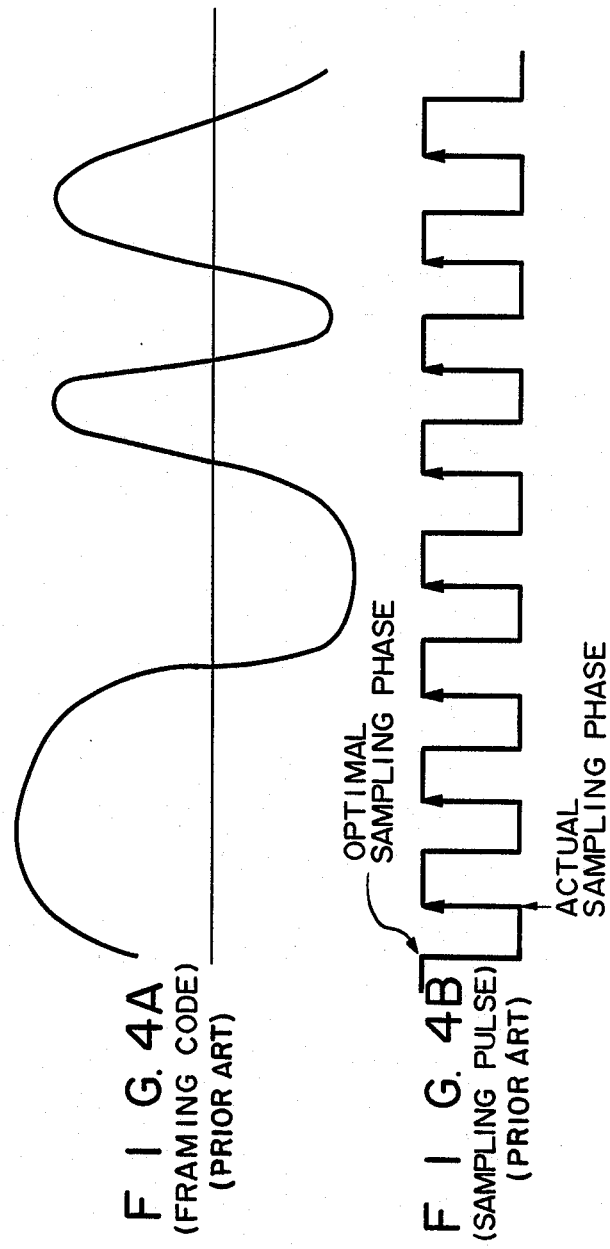

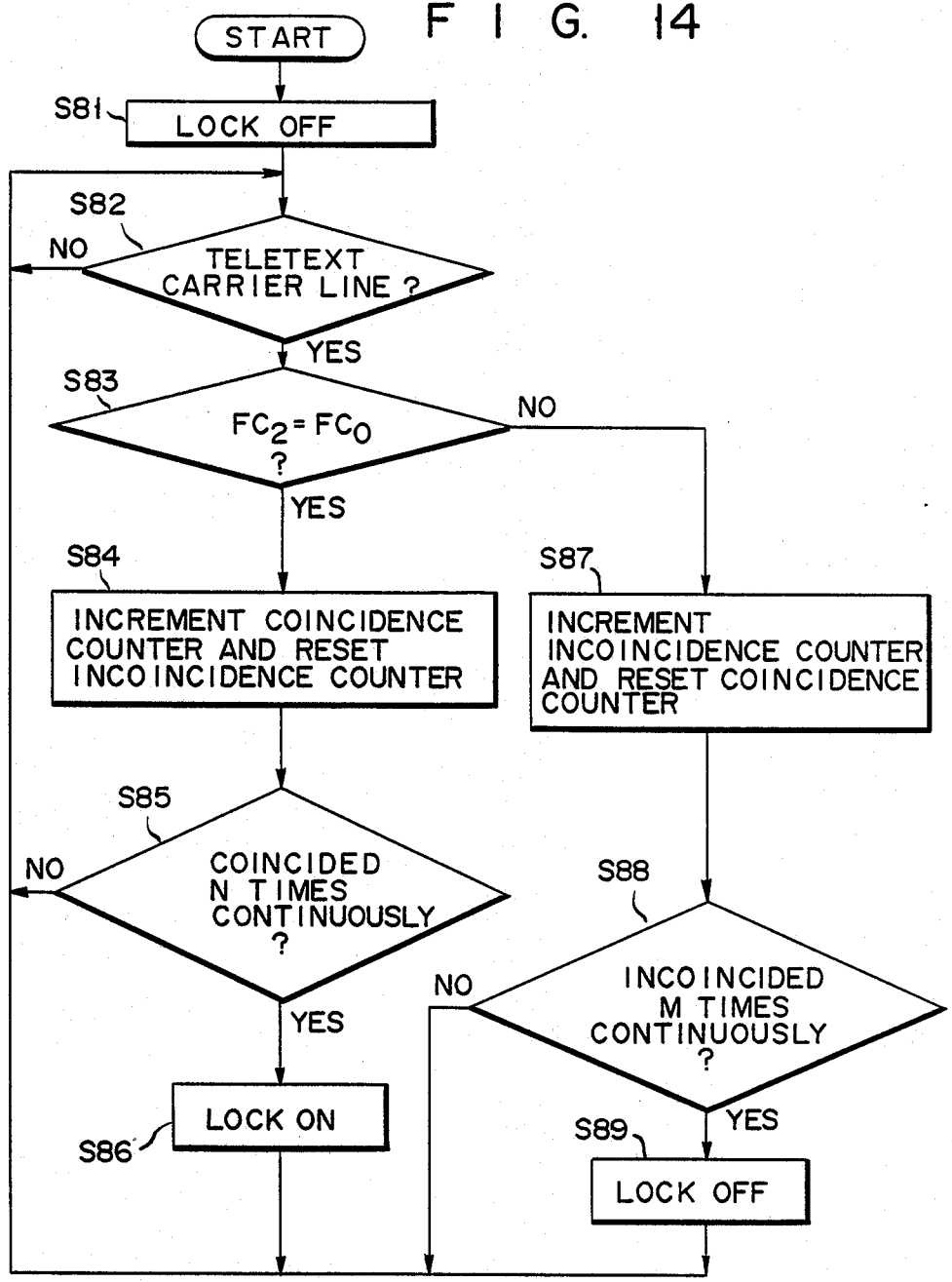

APPARATUS FOR RELIABLY FETCHING DATA, ON THE BASIS OF FRAMING CODE DETECTION PROCESS, AND METHOD THEREFOR

BACKGROUND OF THE INVENTION

This invention relates to an apparatus for reliably fetching data, on the basis of a framing code detection process, and a method therefor and, more particularly, to an apparatus and a method, for use in a teletext receiver, for detecting a packet-synchronizing framing code added to a start portion of each packet of a coded information signal, and for stabilizing a reference signal used to fetch a data signal following the framing code.

In a conventional code-transmission type teletext system, a coded teletext signal superposed within a vertical blanking period of a television signal is restored at the receiver side. For this reason, a synchronizing component is added to the start portion of the teletext signal. The synchronizing component is an 8-bit framing code (FC) for synchronizing the subsequent packet (information component).

The framing code (FC) represents the start of transmission of the subsequent information data (i.e., a data packet). In order to properly fetch information and achieve accurate packet synchronization, the framing code (FC) must be accurately detected. For this purpose, a specific pattern "11100101" is employed as the framing code (FC). This is because the framing code can be accurately detected even if an error occurs in the specific pattern. The specific code aims at setting an accurate minimum code length between the adjacent framing codes to be "3".

A one-bit error-correction function is assigned to the framing code (FC), and, as a result, more accurate packet (frame) synchronization can be achieved. In addition, fetching of information data can be expected to be performed more reliably.

In practice, in order to fetch information data, various reference signals must be generated on the basis of the detection results of framing codes (FC).

The one-bit error-correction function of the framing code (FC), however, adversely affects the process of setting of these reference signals. More specifically, no problem arises even when a one-bit error occurs and the framing code is then detected in this state. When a framing code is detected as the correct framing code at a timing deviating by one bit from the correct timing, according to the one-bit error-correction function, various reference signals for fetching the subsequent data cannot then be accurately set.

As described above, in a conventional teletext receiver for generating various reference signals on the basis of the framing detection results, the reference signals used for accurately fetching information data cannot be accurately set. As a result, the teletext signals cannot be reliably fetched.

SUMMARY OF THE INVENTION

It is, therefore, an object of the present invention to provide a new and improved-reliability data-fetching apparatus and method, based on framing code detection, which permits the optimal setting of the reference signals and thus reliable data fetching.

According to one aspect of the present invention, there is provided a data-fetching apparatus comprising:

input means for periodically receiving a transmission signal including a framing code and a data signal following the framing code, the framing code being constituted by a predetermined pattern which can be identified even if a bit error is included therein;

signal-fetching means for receiving the transmission signal and fetching the transmission signal upon detecting the framing code which is included therein, on the basis of a predetermined reference signal;

framing code-detecting means for receiving an output from the signal-fetching means and comparing it with prepared pattern data corresponding to the predetermined pattern of the framing code, the framing code-detecting means being adapted to generate a first framing code-detection output, for supply to said signal-fetching means, as a signal for providing the timing when the output from the signal-fetching means represents a bit error with respect to the pattern data, and to generate a second framing code-detection output when the output from the signal-fetching means represents no bit error with respect thereto; and reference signal-generating means for receiving the second framing code-detection output from the framing code-detecting means, and generating the predetermined reference signal supplied to the signal-fetching means, in response to the second framing code-detection output.

BRIEF DESCRIPTION OF THE DRAWINGS

These and other objects and features of the present invention can be understood through the following embodiments, by reference to the accompanying drawings, in which:

FIGS. 3A and 3B, FIGS. 4A, 4B, and 4C and FIG. 5 are views for explaining the principle of the present invention;

FIG. 14 is a flowchart for explaining the operation of the third embodiment.

DETAILED DESCRIPTION OF THE PREFERRED EMBODIMENTS

Before describing prefered embodiments of the present invention, the principle of the present invention will be described below.

Figure 2:
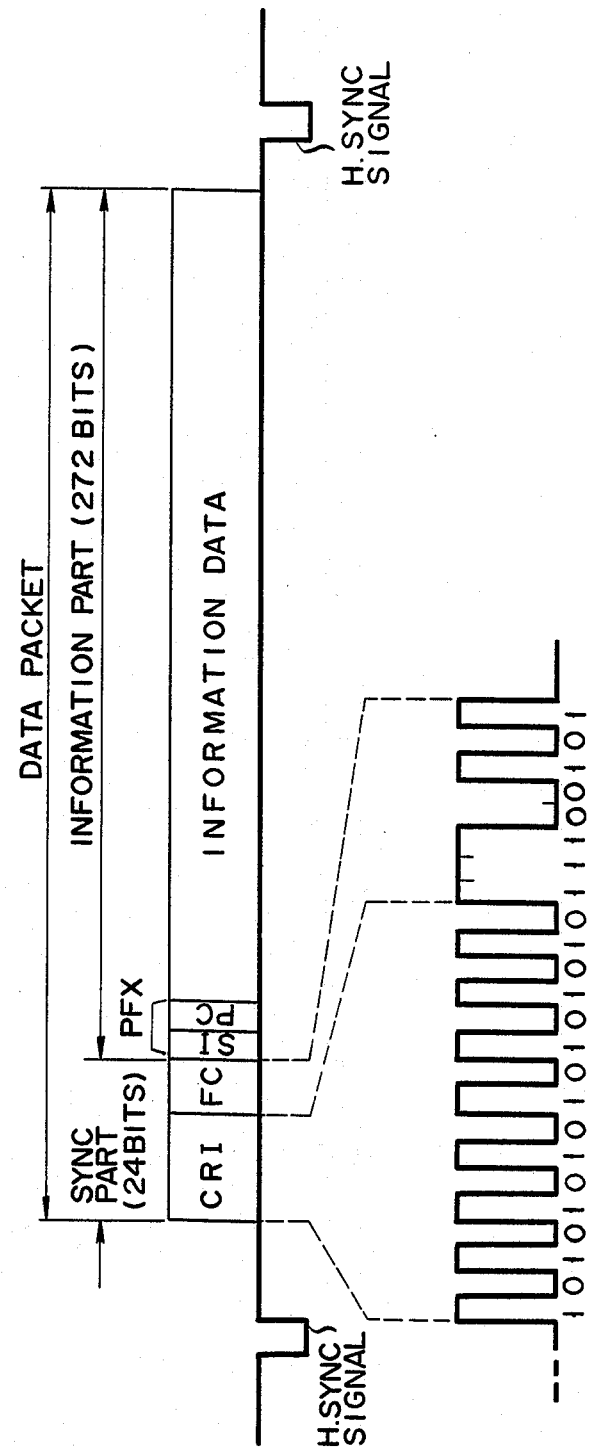
FIG. 2 is a chart of a format of teletext signal.

FIG. 2 shows a format of a teletext signal generated according to a coding transmission system. The synchronizing part is formatted with an information part as one data packet of the teletext signal. The first 16 bits of the synchronizing part constitute a clock run-in CRI used to establish phase synchronization (i.e., bit synchronization) for sampling data of the teletext signal.

The next 8 bits constitute a framing code FC which represents the start of transmission of the information data and which establishes frame (packet) synchronization of the teletext signal. Following the framing code, a 272-bit information part is transmitted.

Prefix PFX consisting of 8-bit service-identification SI and 6-bit packet-control PC are added to the beginning of the information part.

Figure 1:
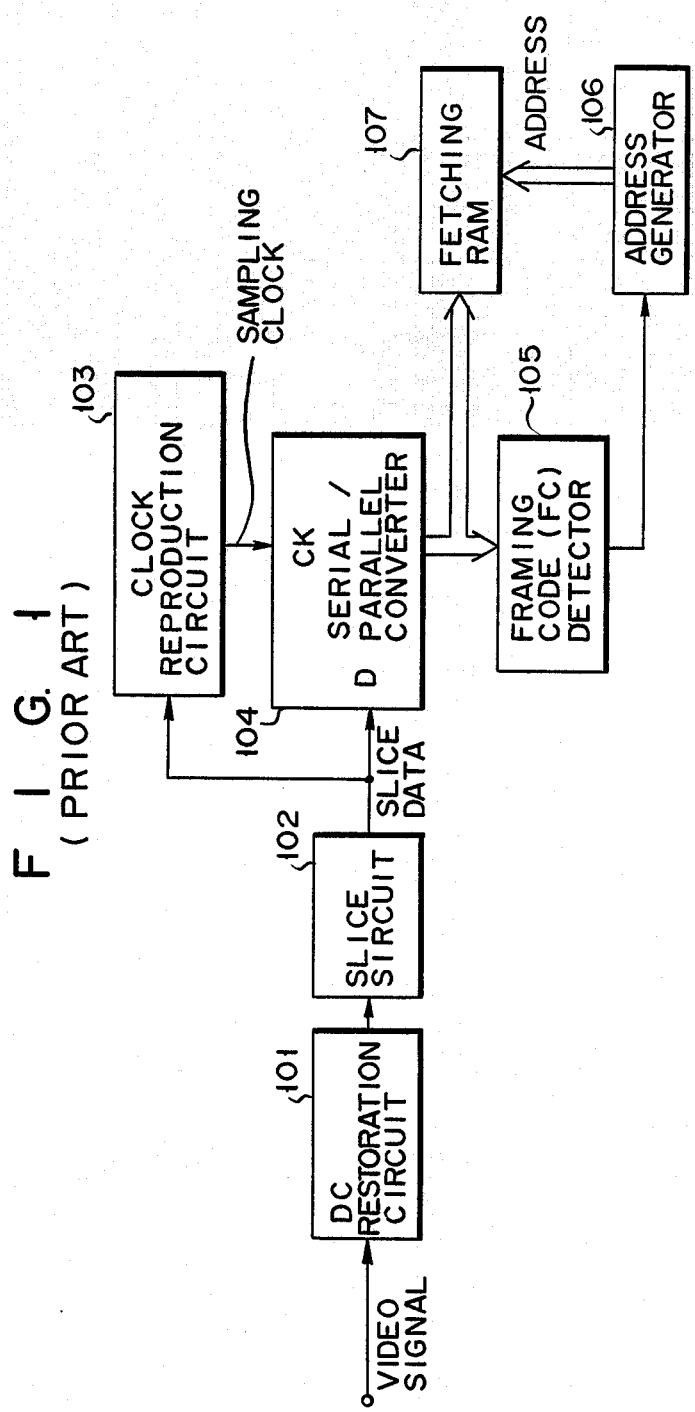
FIG. 1 is a block diagram of a conventional teletext receiver.

The teletext signal having this format is generally received and processed as follows:

In the conventional teletext receiver of FIG. 1, the pedestal level of a video signal (FIG. 2) superposed with the teletext signal of a coding transmission system is clamped by DC restoration circuit 101. An output from restoration circuit 101 is sliced, at a predetermined slice level, by slice circuit 102, to convert the input video signal into digital (binary) data. Clock reproduction circuit 103 generates sampling clocks for sampling the teletext signal, on the basis of clock run-in CRI in the sliced teletext signal. Serial/parallel (S/P) converter 104 samples the sliced data, in response to the sampling clocks and converts it into one-byte (8 bits) parallel data. Framing code (FC) detector 105 detects framing code FC from the parallel data. Upon detection of framing code FC, address generator 106 generates a write address signal, and parallel data following the framing code (FC) is fetched. The resultant data is thus written in RAM 107. A display processor (not shown) decodes the teletext signal stored in RAM 107, and the decoded data is displayed as an image on a CRT or the like.

In the teletext receiver described above, various reference signals required for fetching are generated on the basis of the result of detection of framing code FC (to be referred to as framing detection hereinafter).

(1) A conventional slice circuit sets a slice level on the basis of the framing detection result. More specifically, the slice level is changed in order to detect upper and lower limit levels which allow framing detection, and an intermediate level between the limit levels is defined as the slice level.

Figures 3A, 3B:
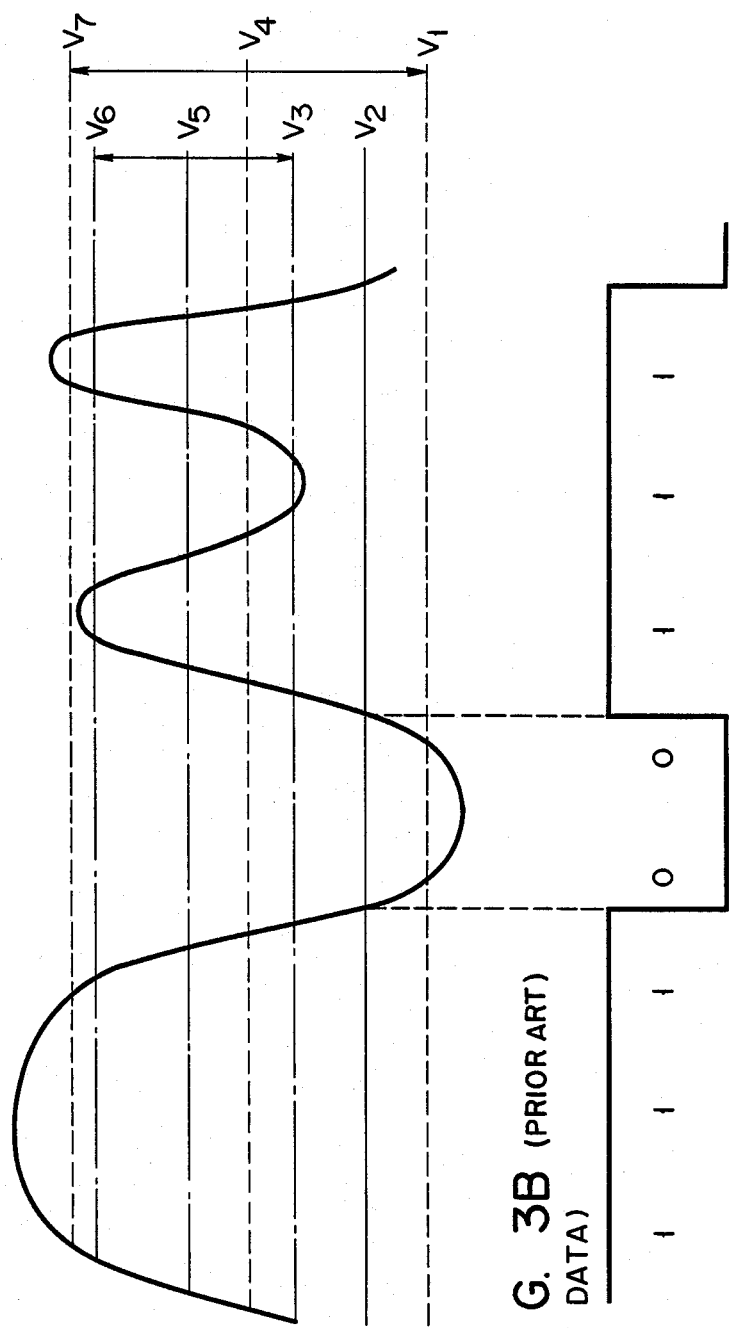

However, since framing code FC has the one-bit error correction function, the following problem occurs:

As is shown in FIGS. 3A and 3B, even if the waveform of framing code FC (FIG. 3A) is distorted, a one-bit error "11100111" occurs in sliced data (FIG. 3B), even at slice level $V_2$. As a result, framing detection can be performed. This dttection is performed between upper limit level $V_1$ and lower limit level $V_7$ according to the one-bit correction function, and the slice level is set to be $V_4$, this being the intermediate value between $V_1$ and $V_7$. If the distorted wave is sliced at optimal slice level $V_5$, the corresponding dynamic range falls between $V_5$ and $V_3$. The dynamic range for slice level $V_4$ is narrowed to fall between $V_4$ and $V_3$. Slice level-setting according to this technique leads to narrowing of the dynamic range, with the result that data cannot be optimally sliced.

(2) A conventional clock reproduction circuit sets the reproduced phase of the sampling clock on the basis of the framing detection result. In the clock reproduction circuit, the teletext signal is sampled in response to a plurality of clocks having different phases but an identical frequency. The optimal phase of the sampling clock is determined by the phase in which framing detection is performed.

The following problem is posed due to the one-bit error-correction function being performed in the same manner as in item (1) described above:

As is shown in FIGS. 4A to 4C, even if framing code FC (FIG. 4A), subjected to waveform distortion, is sampled by a sampling clock (FIG. 4B) having a phase substantially opposite (e.g., a 180° delayed phase) to the optimal sampling phase, sampled data (FIG. 4C) is "11100111", thus allowing framing detection. In other words, since framing detection is performed in a wide phase range, the sampling phase set on this basis cannot be optimal. Therefore, in the clock reproduction circuit according to this technique, optimal data aampling cannot be performed.

(3) A conventional framing code reproduction circuit utilizes continuity of the teletext signal to perform reproduction of a framing detection timing which is free from disturbance. When an internal period counter having one horizontal period is phase-corrected at the framing detection timing, pre- and post-protectoon countermeasures are utilized to provide a flywheel effect, thereby compensating for framing detection incapability caused by a disturbance.

Figure 5:
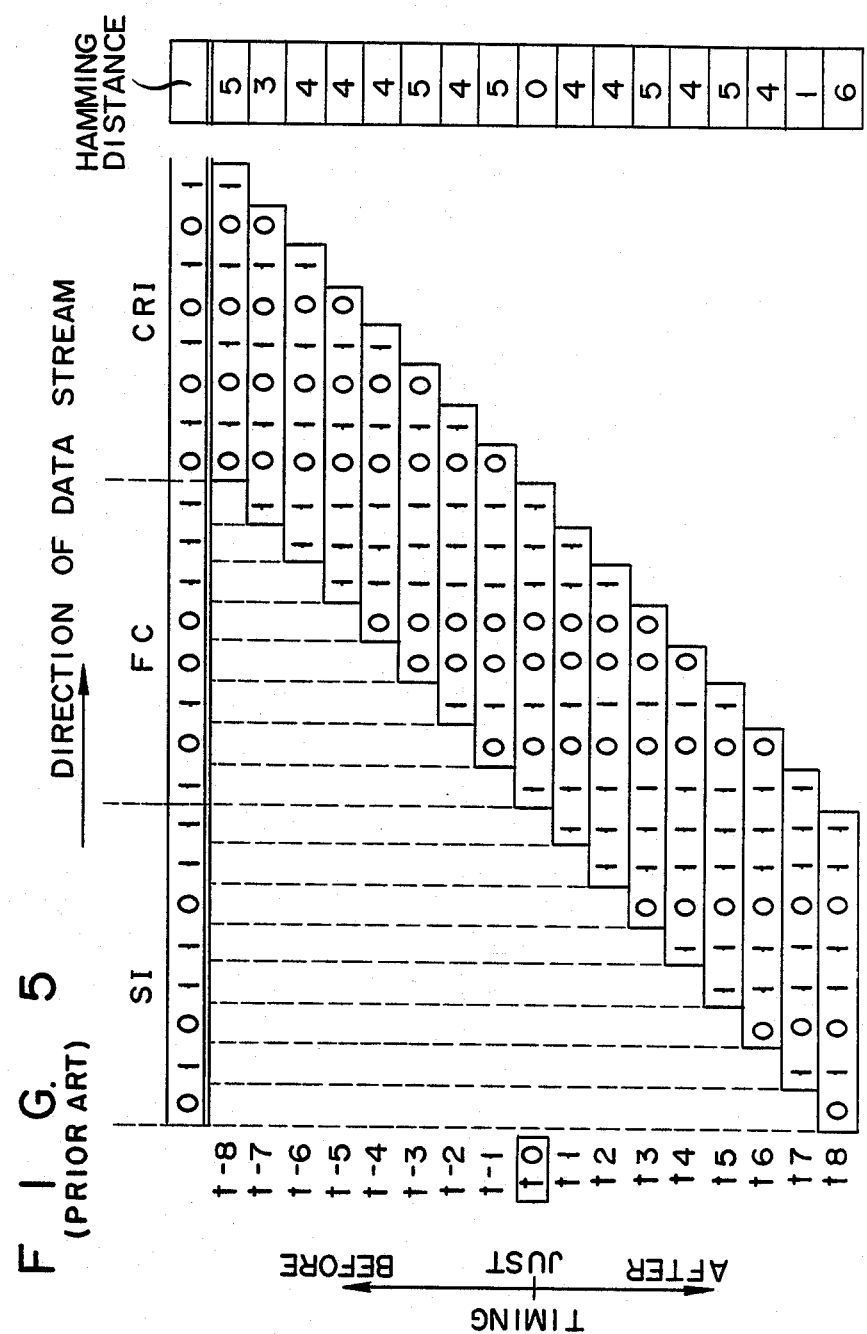

As is shown in FIG. 5, the minimum value of a distance up to timing t0, for normally sending framing code FC, that is, a hamming distance, is "3" (timing t-7). Thereafter, the hamming distance may be "1", depending on the type of data. For example, when service identification code SI following framing code FC is "$DA_{(16)}$", i.e., "1101 $1010_{(2)}$", the hamming distance is "1" at timing t7, and framing detection is performed according to the one-bit error-correction function. Normally, at this timing, detection is interrupted by gating a framing code in response to a framing code gate signal. However, if the width of the gate signal is excessively large or the gate signal deviating to the past direction, erroneous framing detection is then performed.

If a 2-bit error occurs at timing t-7 when the hamming distance is "3", the one-bit error is detected, and unnecessary framing detection is performed at this timing.

As described above, the one-bit error-correction function is assigned to the framing code reproduction circuit, according to the above technique. If framing detection is performed at a timing deviating from the proper timing, flywheel operation is initiated at this wrong timing. Accurate framing reproduction cannot be performed until the proper timing is restored. Therefore, this type of teletext receiver has a disadvantage in that a burst reception error occurs.

According to the present invention, one-bit error-corrected framing detection is performed in order to fetch data such as a teletext signal. One-bit error non-corrected framing detection is performed to set the necessary reference signals. Therefore, the optimal reference signals for normal framing detection are used to achieve the above objects.

Teletext receivers of a coding transmission system according to first to third embodiments of the present invention will now be described with reference to the accompanying drawings.

[First Embodiment]

Figure 6:
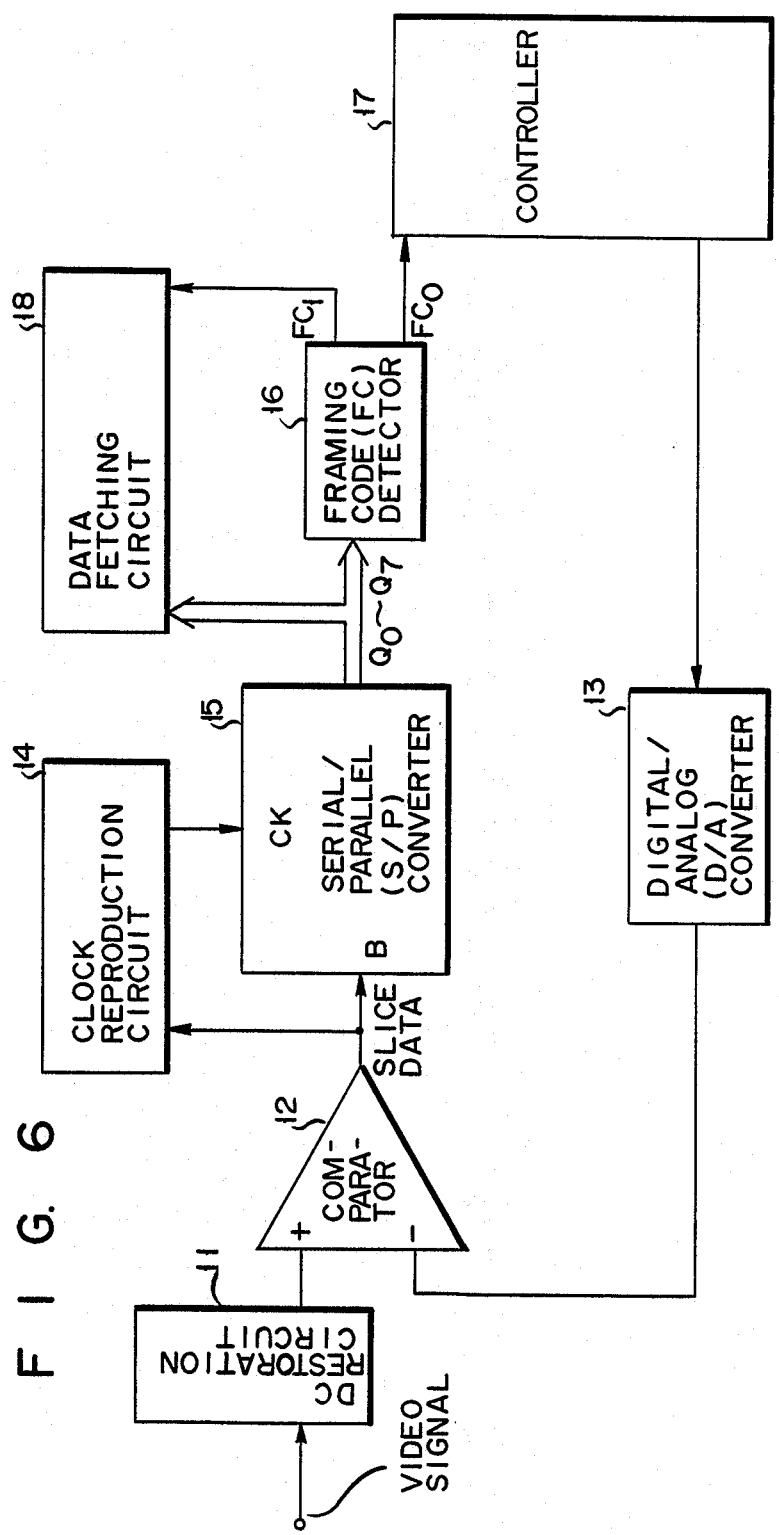
FIG. 6 is a block diagram showing a first embodiment of the present invention.

The first embodiment of the present invention is shown in FIG. 6. The teletext receiver of this embodiment sets a slice level according to the framing detection results, when the slice level is changed.

Referring to FIG. 6, the pedestal level of a video signal superposed with a teletext signal of a coding transmission system having a format as shown in FIG. 2 is clamped by DC restoration circuit 11, and an output representing the pedestal-clamped video signal is sliced by comparator 12 according to a slice level supplied from digital/analog (D/A) converter 13. The first 8-bit data of the slice data following the CRI signal is sampled by serial/parallel (S/P) converter 15, in response to sampling clocks output from clock reproduction circuit 13, in the same manner as in FIG. 1. The 8-bit data is converted into parallel data bits $Q_0$ to $Q_7$ that correspond to the framing code (FC) in the teletext signal. Framing code (FC) detector 16 receives parallel data bits $Q_0$ to $Q_7$, and detects framing code FC. In framing detection, there are two different outputs: one is first framing detection output $FC_1$, obtained after one-bit error correction; and the other is second framing detection output $FC_0$, without one-bit error correction. Controller 17 comprising a microprocessor determines a slice level on the basis of output $FC_0$, and the slice level is set by D/A converter 13.

First framing detection output $FC_1$ and parallel data bits as the subsequent data output from S/P converter 15 are supplied to data-fetching circuit 18. After the slice level is determined, the subsequent data is fetched by fetching circuit 18, in response to output $FC_1$.

The detailed arrangement of FC detector 16 will now be described with reference to FIG. 7.

Figure 7:
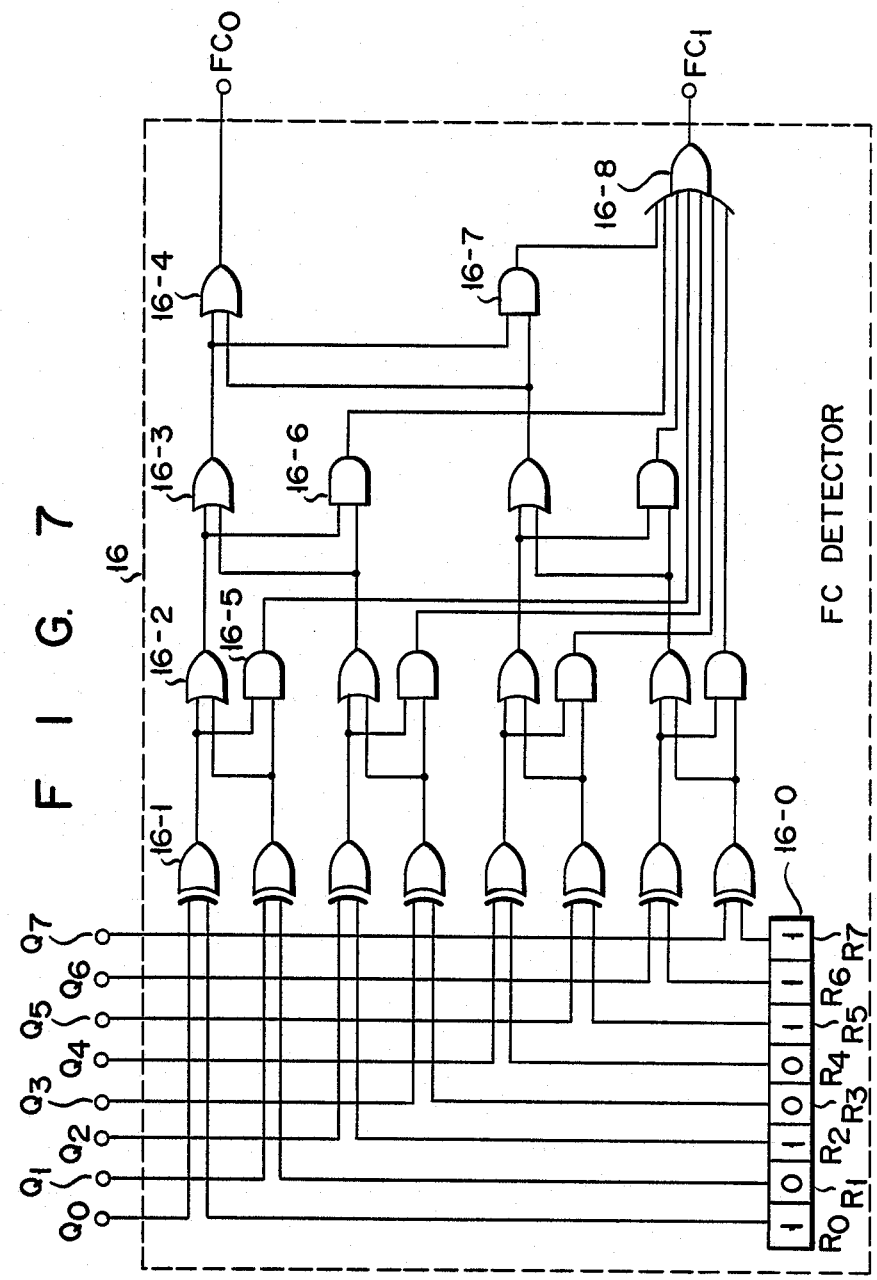
FIG. 7 is a circuit diagram of a framing code (FC) detector in FIG. 6.

Referring to FIG. 7, parallel data bits $Q_0$ to $Q_7$ output from S/P converter 15 are compared, by exclusive OR gates 16-1, with framing code data bits $R_0$ to $R_7$ stored in register 16-0, respectively. If each of bits $Q_0$ to $Q_7$ coincides with a corresponding one of bits $R_0$ to $R_7$, a logic "0" is output from corresponding exclusive OR gate 16-1. Otherwise, a logic "1" is output. Therefore, if comparison outputs from exclusive OR gates 16-1 are logically ORed by first OR gates 16-2, second OR gates 16-3, and third OR gate 16-4, parallel data bits $Q_0$ to $Q_7$ respectively coincide with framing ccode data bits $R_0$ to $R_7$, whereby second framing detection output $FC_0$ without one-bit error correction is obtained.

On the other hand, 2-bit noncoincidence of 2-bit pairs of all comparison outputs from ecclusive OR gates 16-1 is detected by first AND gates 16-5, second AND gates 16-6, and third OR gate 16-7. Noncoincidence of two or more bits, i.e., noncoincidence of outputs from AND gates 16-5, 16-6, and 16-7, is detected by fourth OR gate 16-8, whereby first framing detection output $FC_1$ subjected to one-bit error correction is obtained.

Figure 8:
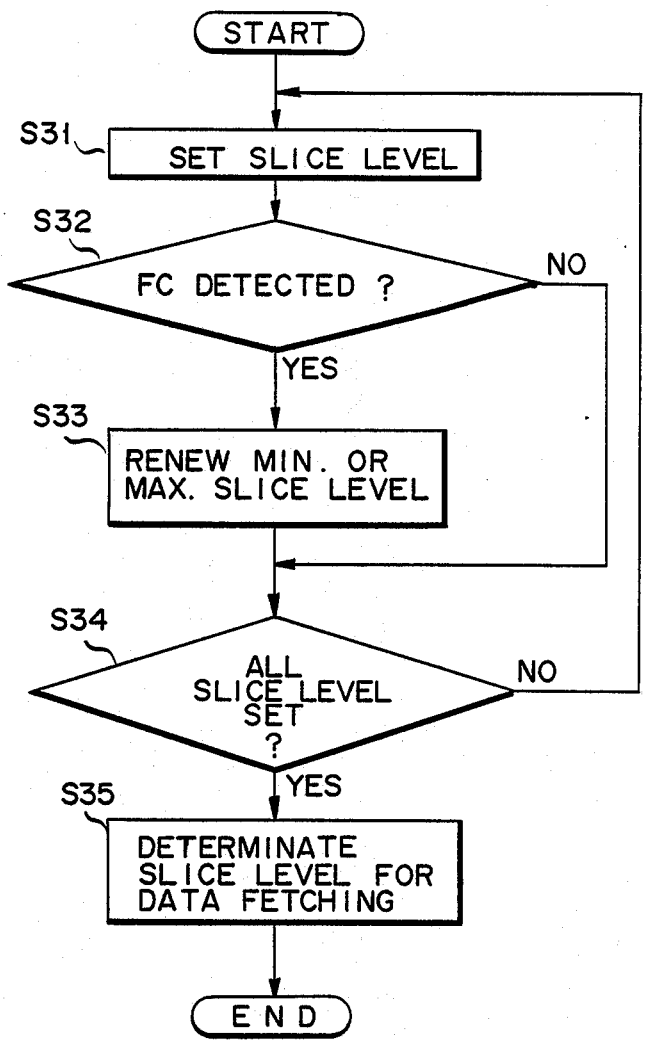
FIG. 8 is a flowchart for explaining the operation of the circuit in FIG. 6.

The operation of the first embodiment, as shown in FIG. 6, will now be described with reference to the flowchart of FIG. 8.

In order to obtain maximum slice level MAX for performing framing detection, controller 17 comprising a microprocessor sets a minimum slice level (step S31), and determines in step S32 whether second framing detection output $FC_0$, without error correction, can be obtained at this level. In step S33, controller 17 updates maximum slice level MAX only when FC detector 16 outputs second framing detection output $FC_0$. In this manner, controller 17 resets the slice level until it is reaches the maximum level (step S34).

In the same manner as described above, controller 17 reduces the slice level from the maximum to the minimum level, thereby obtaining minimum slice level MIN which allows framing detection. In step S35, controller 17 causes D/A converter 13 to set an intermediate value between levels MAX and MIN as the data-fetching slice level. Thereafter, data fetching commences at the intermediate level, in response to first framing detection output $FC_1$.

In the first embodiment, the slice level is set on the basis of the level determined by second framing detection output $FC_0$ and obtained by framing detection performed without an error. In the case of FIG. 3A, $V_6$ and $V_3$ are respectively obtained as the maximum and minimum values. In this case, since the slice level is set to be an intermediate value, i.e., $V_5$ between $V_6$ and $V_3$, a dynamic range for allowing data slicing without errors can be widened. In the teletext receiver having the arrangement as described above, optimal data slicing can be performed, and data can be reliably fetched.

In order to fetch data, first framing detection output $FC_1$ obtained after one-bit error correction is used to achieve stable frame synchronization.

[Second Embodiment]

A second embodiment of the present invention will now be described below. A teletext receiver according to this embodiment determines a sampling clock phase on the basis of the framing detection result, when the sampling clock phase is changed.

Figure 9:
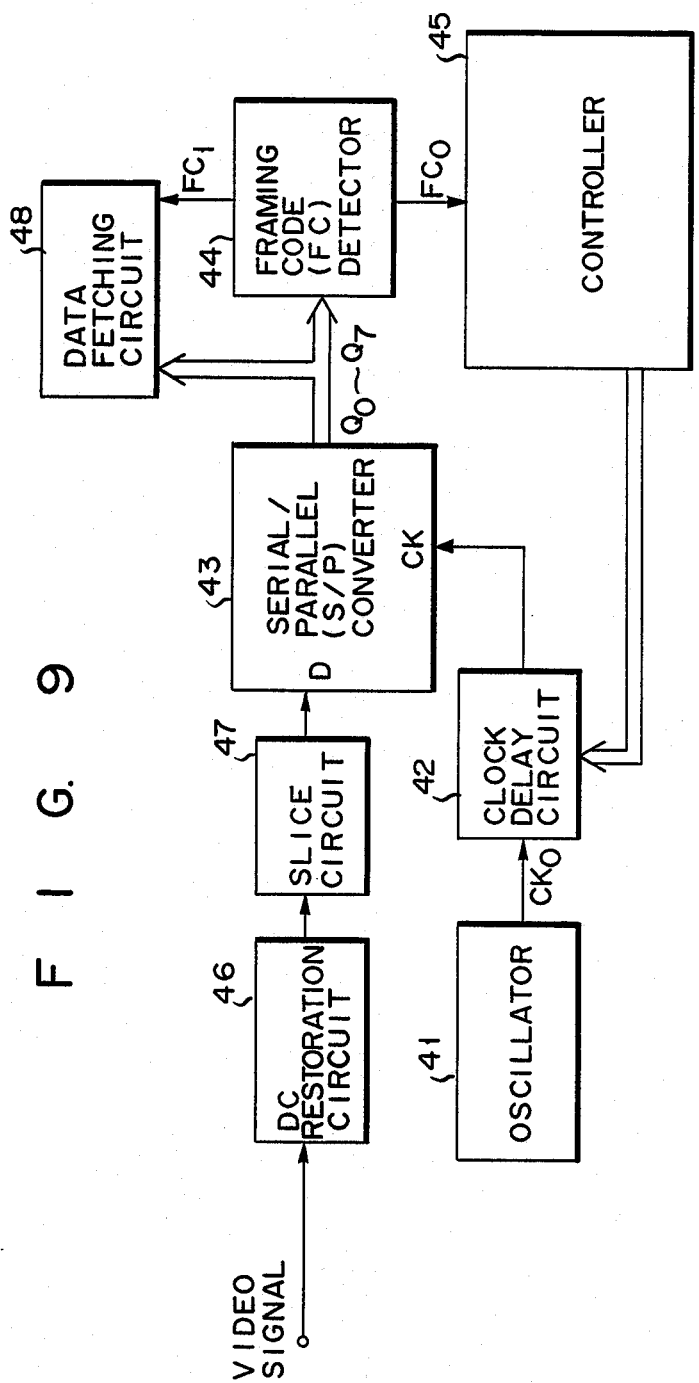
FIG. 9 is a block diagram showing a second embodiment of the present invention.
Figure 10:
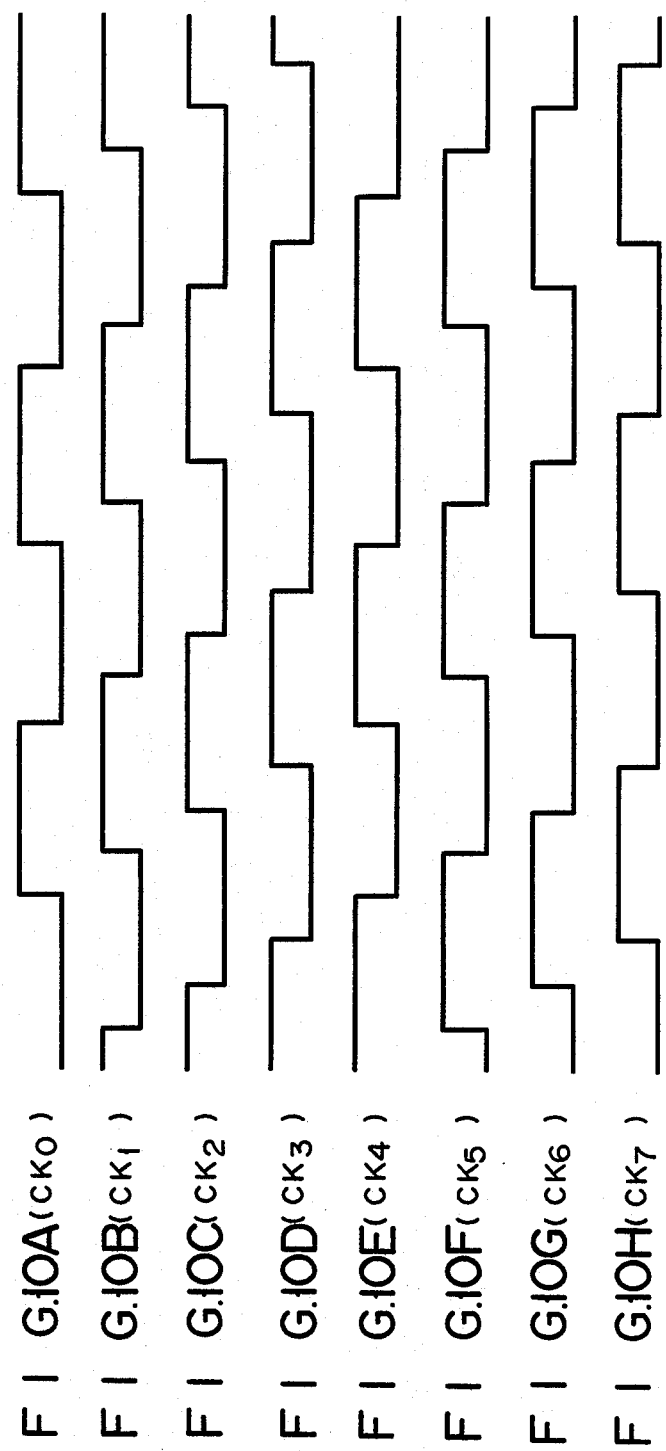
FIGS. 10A to 10H are timing charts illustrating output waveforms from a clock delay circuit shown in FIG. 9.
Figure 11:
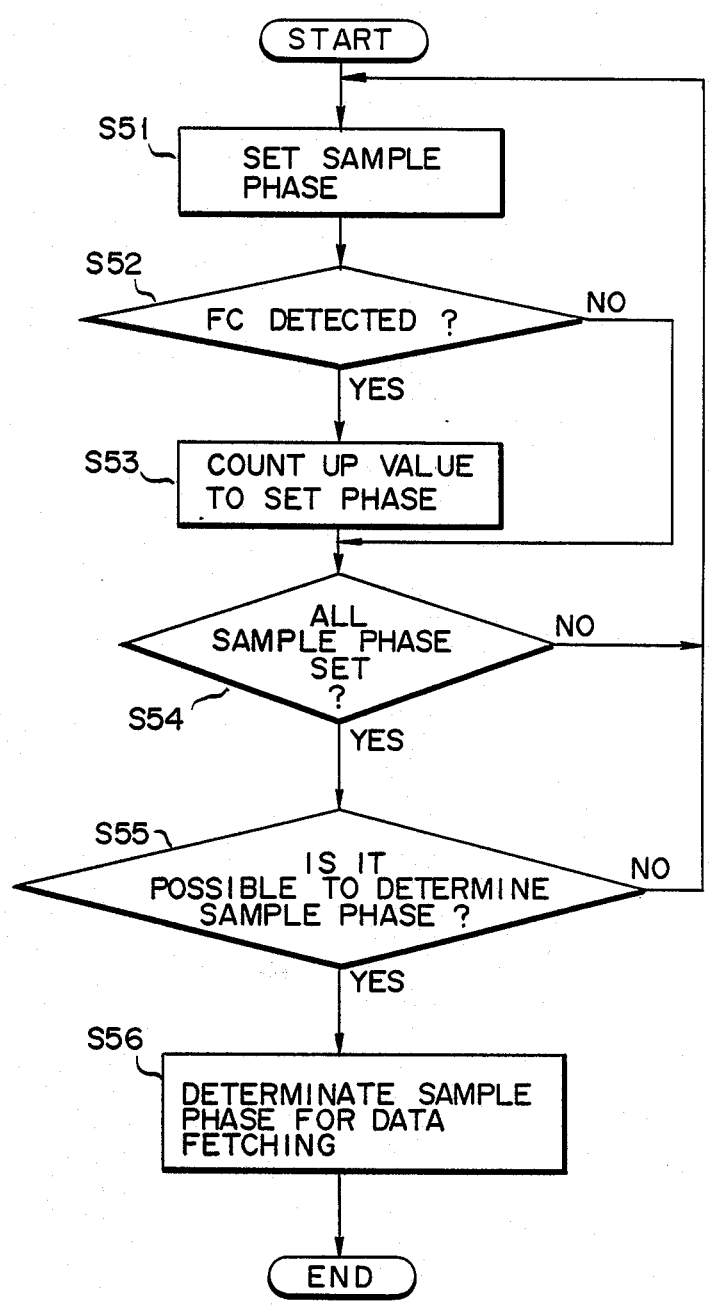
FIGS. 11 and 12 are respectively a flowchart and a graph showing a phase distribution of samples, to explain the operation of the second embodiment.

Referring to FIG. 9 showing the second embodiment, oscillator 41 outputs clock $CK_0$ (FIG. 10A) having the same frequency as that of the sampling clock. Clock delay circuit 42 generates a plurality of clocks $CK_0$ to $CK_7$ (FIGS. 10A to 10H) having different delay times, on the basis of clock $CK_0$, and supplies one of the clocks as a sampling clock to serial/parallel (S/P) converter 43. Sliced data of the video signal obtained, by means of DC restoration circuit 46 and slice circuit 47, in the same manner as in FIG. 1, is sampled and converted into parallel data. Framing code (FC) detector 44 performs error correction on the basis of the parallel data, in the same manner as in the first embodiment, and outputs first framing detection output $FC_1$ with error correction and second framing detection output $FC_0$ without error correction. Output $FC_0$ is supplied to controller 45 including a microprocessor, and a clock phase distribution for allowing framing detection is calculated. An optimal sample phase is determined by this distribution. Controller 45 causes clock delay circuit 42 to output the clock having that phase as a sampling clock. Output $FC_1$ and the parallel data as the subsequent data are supplied to data-fetching circuit 48. After the clock phase is set, subsequent data fetching is performed in response to output $FC_1$ The operation of the second embodiment, as shown in FIG. 9, will now be described with reference to the flowchart of FIG. 11.

In order to calculate the phase distribution of sampling clocks which allow framing detection, controller 45 including the microprocessor sets an initial phase in clock delay circuit 42 (step S51). Controller 45 causes a counter (which may be a software counter) corresponding to the sample phase and arranged in controller 45 to count up only when second framing detection $FC_0$ is obtained (steps S52 and S53). The above steps are repeated while the sample phase is changed throughout the entire sample range (step S54). As a result, the count value (i.e., FC detection number) of the counter corresponding to the sample phase is represented by a characteristic curve (a) shown in FIG. 12. In step S55, controller 45 repeats the above steps until the count value reaches predetermined value N (step S55). When the count value reaches value N, the sample phase is determined (step S56). In the characteristic curve (a) shown in FIG. 12, intermediate phase $P_4$ between end phases $P_2$ and $P_5$ is selected to determine the sample phase. Thereafter, data-fetching circuit 48 fetches data bits $Q_0$ to $Q_7$, in response to first framing detection output $FC_1$.

Figure 12:
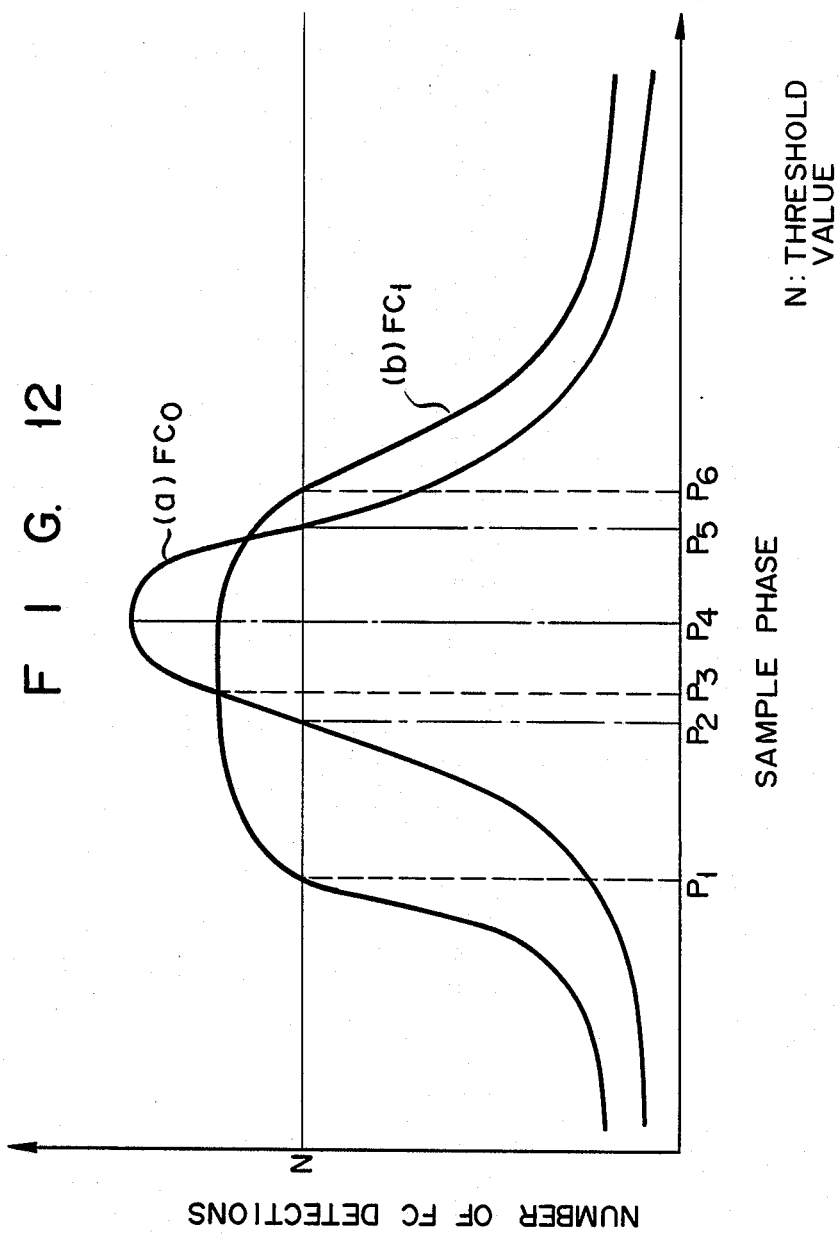

According to the second embodiment, since the sampling clock phase is determined on the basis of the sample phase determined by second framing detection output $FC_0$ obtained by framing detection without an error, an optimal sample phase can be obtained. According to the conventional characteristic curve (b) (FIG. 12) obtained on the basis of framing detection output $FC_1$ as a result of one-bit error correction, the phase range is widened and does not determine an optimal phase. In FIG. 12, an intermediate phase $P_3$ of the curve (b) is detected without the intermediaee phase $P_4$ of the curve (a) as an optimal phase.

Since first framing detection output $FC_1$ obtained upon one-bit error correction is used for data fetching, reliable frame synchronization can be realized.

[Third Embodiment]

A third embodiment of the present invention will now be described. A teletext receiver according to this embodiment utilizes continuity of a teletext signal to reproduce a framing detection phase which is free from disturbance.

Figure 13:
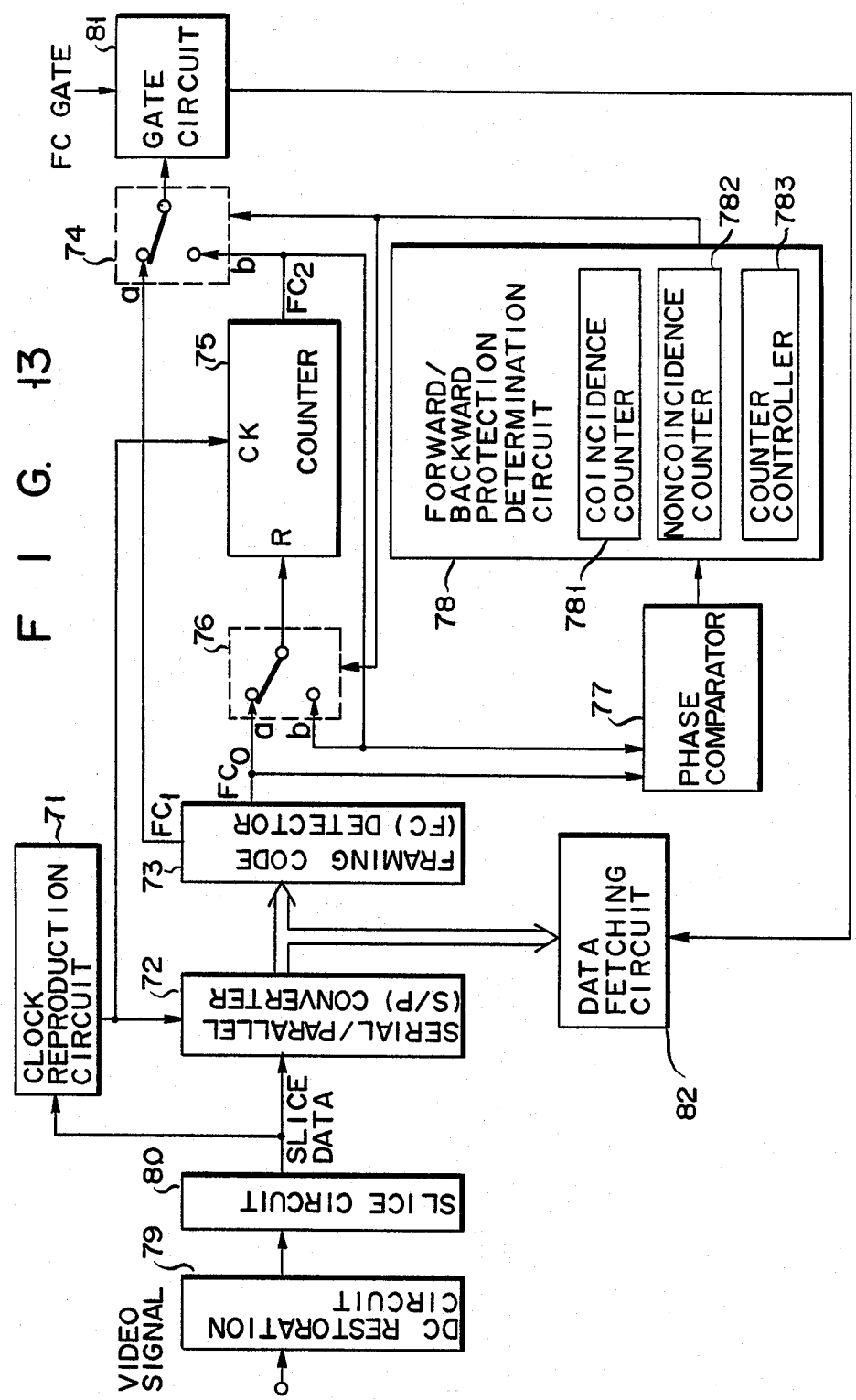
FIG. 13 is a block diagram showing a third embodment of the present invention.

Referring to FIG. 13, serial/parallel (S/P) converter 72 samples sliced data in response to sampling clocks from clock reproduction circuit 71, and converts it into parallel data. The sliced data is derived from the video signal, by means of DC restoration circuit 79 and slice circuit 80, in the same manner as in FIG. 1. Framing code (FC) detector 73 outputs first framing detection output $FC_1$ with error correction and second framing detection output $FC_0$ without error correction, in the same manner as in the first embodiment. Output $FC_1$ is output as a frame synchronizing pulse via switch 74 and gate circuit 81, and supplied, together with the parallel data as the subsequent data, to data-fetching circuit 82.

Counter 75 comprises a base-364 counter for counting the sampling clocks, and reproduces timing signal $FC_2$ for detecting second framing detection output $FC_0$. Signal $FC_2$ is switched and output with first framing detection output $FC_1$, by means of switch 74. Since the frequency of the sampling clocks is 364 times the horizontal frequency, counter 75 has a cycle of one horizontal period. Output $FC_0$ or signal $FC_2$ from counter 75 is selectively supplied to counter 75, as a reset pulse by switch 76. This selection is controlled by forward/backward protection determination circuit 78, on the basis of the result of comparison between outputs $FC_0$ and $FC_2$ by phase comparator 77. Determination circuit 78 includes coincidence counter 781, noncoincidence counter 782, and counter controller 783.

The operation of determination circuit 78 will now be described, with reference to the flowchart of FIG. 14. In step S81, switches 74 and 76 are set in the a position, and counter 75 is reset in response to second framing detection output $FC_0$, thereby achieving phase locking. At the same time, first framing detection output $FC_1$ is selected as a frame-synchronizing pulse (lock-off). In steps S82 to S85, if the phases of timing signal $FC_2$ and second framing detection output $FC_0$ coincide with each other N times continuously, determination circuit 78 sets switches 74 and 76 to the b position, in step S86. In this state, signal $FC_2$ is selected as a frame-synchronizing pulse and as a self-reset pulse of counter 75 (lock-on).

However, if signals $FC_2$ and $FC_0$ do not coincide with each other M times consecutively (steps S82, S83, S87, and S88), switches 74 and 76 are set in the a position, in step S89, thereby achieving lock-off and initiating phase locking.

The technique for reproducing timing signal $FC_2$, for detecting second framing detection output $FC_0$, is the same as that for reproducing framing detection phase DP2 of FIGS. 4 and 5 in U.S. patent application Ser. No. 886,553 entitled "SYNC APPARATUS FOR MULTIPLEX IMAGE TRANSMISSION SYSTEM" filed on July 17, 1986 by the present applicant. Therefore, the parts of the above U.S. application which are associated with the present application are incorporated therein, as exemplified by character signal carry line check in step S82 of FIG. 14 of the present application.

According to the third embodiment, since the flywheel effect is obtained in response to second framing detection output $FC_0$ without error correction, phase locking is not performed at a wrong timing. Therefore, the teletext receiver of this embodiment has an advantage in that a burst reception error rarely occurs. In the lock-off mode, first framing detection output $FC_1$ obtained upon one-bit error correction is used as a frame synchronizing pulse, and thus stable frame synchronization can be achieved.

In each embodiment described above, first framing detection output $FC_1$ with one-bit error correction and second framing detection output $FC_0$ without one-bit error correction are simultaneously output from the framing detector. However, these outputs are output in only the data-fetching and reference signal-setting modes, respectively. The arrangement of the framing code detector is not limited to that illustrated in FIG. 7.

The reference signals are set with respect to the slice level, in the first embodiment, the sampling clock reproduction, in the second embodiment, and framing code reproduction, in the third embodiment. However, the present invention is not limited to these.

According to the present invention, since the reference signals are set by using the framing detection output without error correction, optimal reference signals can be set. The framing detection output with one-bit error correction is used for data fetching, thereby achieving reliable data fetching.

What is claimed is:

1. A data-fetching apparatus comprising:
    input means for periodically receiving a transmission signaliincluding a framing code and a data signal following the framing code, the framing code being constituted by a predetermined pattern which can be identified even if a bit error is included therein;
    signal-fetching means including extracting means for receiving the transmission signal from said input means, and extracting the framing code and the component of the data signal, both of which are included in the transmission signal, on the basis of a predetermined reference signal;
    framing code-detecting means for receiving an output from said signal-fetching means and comparing said output with prepared pattern data corresponding to the predetermined pattern of the framing code, said framing code-detecting means being adapted to generate a first framing code-detection output, for supply to said signal-fetching means, as a signal for providing the timing when the output from said signal-fetching means represents a bit error with respect to the pattern data, and to generate a second framing code-detection output when the output from said signal-fetching means represents no bit error with respect thereto;

said signal fetching means also including data-fetching means for fetching a component of the data signal included in an output from said extracting means, on the basis of the first framing code-detection output, when said framing code-detecting means generates the first framing code-detection output on the basis of the reference signal; and reference signal-generating means for receiving the second framing code-detection ottput from said framing code-detecting means, and generating the predetermined reference signal supplied to said signal-fetching means, in response to the second framing code-detection output.

2. An apparatus according to claim 1, wherein said reference signal-generating means includes control means for receiving the second framing code-detection output from said framing code-detecting means, and outputting a control signal for controlling the reference signal, and determination means for receiving the control signal from said control means, and determining the reference signal.

3. An apparatus according to claim 2, wherein said signal-fetching means includes extracting means for receiving the transmission signal and extracting the framing code and the component of the data signal, both of which are included in the transmission signal, on the basis of a predetermined reference signal, and data-fetching means for fetching the component of the data signal included in the output from said extracting means, on the basis of the first framing code-detection output, when said framing code-detecting means for receiving the output from said extracting means, on the basis of the reference signal generated by said reference signal-generating means, generates the first framing code-detection output.

4. An apparatus according to claim 3, wherein said extracting means includes a slice circuit, said determination means determines a slicing signal having a predetermined level for said slice circuit, and said control means outputs a slice signal having a predetermined level as the control signal.

5. An apparatus according to claim 4, wherein said determination means determines the predetermined level of the slicing signal, in accordance with maximum and minimum slice levels capable of detecting the framing code.

6. An apparatus according to claim 3, wherein said extracting means includes a sampling circuit, said determination means determines a sampling clock having a predetermined phase distribution for said sampling circuit, and said control means outputs a predetermined phase of the sampling clock as the control signal.

7. An apparatus according to claim 6, wherein said determination means determines the predetermined phase of the sampling clock, in accordance with a phase distribution of the sampling clock capable of detecting the framing code.

8. An apparatus according to claim 3, wherein said control means receives the second framing code-detection output from said framing code-detecting means, and reproduces a detection timing signal of the second framing code detection output, said determination means determines a number of times of coincidence or noncoincidence between phases of the reproduced detection timing signal and the second framing code detection output, and generates the reproduced detection timing signal as the reference signal when the coincidence is established, and the first framing code detection output, as the reference signal, when noncoincidence is established.

9. An apparatus according to claim 8, wherein said control means includes counter means for counting the second framing code detection output, to make an internal synchronism in one horizontal period, said determination means includes forward/backward protection means for correcting a phase with a detection timing of the framing code which provides forward/backward protection to said counter means, thereby to reproduce the detection timing of the framing code.

10. A data-fetching method comprising the steps of:
periodically receiving a transmission signal including a framing code and a data signal following the framing code, the framing code being constituted by a predetermined pattern which can be identified even it a bit error is included therein;

extracting the framing code and a component of the data signal, both of which are included in the transmission signal received by said periodically receiving step, on the basis of a reference signal;

comparing the transmission signal with prepared pattern data corresponding to the predetermined pattern of the framing code, to generate a first framing code-detection output when the transmission signal represents a bit error with respect to the pattern data, and to generate a second framing code detection output when the transmission signal represents no bit error with respect thereto;

reproducing the reference signal used in said extracting step according to said second framing code-detection output; and fetching a component of the data signal according to said first framing code-detection output when said framing code-detecting means for receiving the output from said extracting means generates the first framing code-detection output on the basis of the reference signal generated by said reference signal-generating means.

* * * * *